(12) United States Patent
Mott et al.

(10) Patent No.: US 8,123,022 B2
(45) Date of Patent: Feb. 28, 2012

(54) CONVEYOR BELT SCRAPER BLADE

(75) Inventors: George T. Mott, Alburtis, PA (US); Aaron T. Gibbs, Easton, PA (US)

(73) Assignee: Asgco Manufacturing, Inc., Allentown, PA (US)

(*) Notice: Subject to any disclaimer, the term of this patent is extended or adjusted under 35 U.S.C. 154(b) by 176 days.

(21) Appl. No.: 12/629,503

(22) Filed: Dec. 2, 2009

(65) Prior Publication Data
US 2011/0067197 A1  Mar. 24, 2011

Related U.S. Application Data

(60) Provisional application No. 61/244,249, filed on Sep. 21, 2009.

(51) Int. Cl.
*B65G 45/12* (2006.01)
*B65G 45/16* (2006.01)
(52) U.S. Cl. .......... 198/497; 198/499; 198/502.1
(58) Field of Classification Search .............. None
See application file for complete search history.

(56) References Cited

U.S. PATENT DOCUMENTS

| | | |
|---|---|---|
| 4,658,949 A | 4/1987 | Reicks |
| 4,825,996 A | 5/1989 | Davidts |
| 4,962,845 A | 10/1990 | Gibbs |
| 5,011,002 A | 4/1991 | Gibbs |
| 5,016,746 A | 5/1991 | Gibbs |
| 5,114,000 A | 5/1992 | Rappen |
| 5,197,587 A | 3/1993 | Malmberg |
| 5,201,402 A | 4/1993 | Mott |
| 5,222,589 A | 6/1993 | Gordon |
| D347,918 S | 6/1994 | Gibbs |
| 5,573,102 A | 11/1996 | Puchalla |
| 5,865,294 A | 2/1999 | Betz |
| 5,979,638 A | 11/1999 | Wiggins |
| 6,182,816 B1 * | 2/2001 | Gibbs et al. ............ 198/497 |
| 6,315,105 B1 | 11/2001 | Gibbs et al. |
| 6,354,428 B1 | 3/2002 | Gibbs et al. |
| D482,508 S | 11/2003 | DeVries |
| 6,986,418 B2 * | 1/2006 | Swinderman et al. ...... 198/497 |

(Continued)

FOREIGN PATENT DOCUMENTS

WO  98-08757  3/1998

OTHER PUBLICATIONS

Flexco, "Belt Cleaner Products—Product Handbook", Jan. 2008, 5 pages.

(Continued)

*Primary Examiner* — Kavel Singh
(74) *Attorney, Agent, or Firm* — Clement A. Berard, Esq; Dann, Dorfman, Herrell & Skillman, PC

(57) ABSTRACT

A scraper blade for a conveyor may comprise: a blade body having a scraping edge and a base for mounting the scraper blade on a blade mount of a conveyor, wherein the blade body has a plurality of elongated recessed features extending across the rearward side thereof, wherein the elongated recessed features are spaced apart and are generally parallel to the scraping edge. Additionally, the base of the blade body may be affixed to a scraper blade mount having a shape of a "flattened W" defining a groove that has beveled edges to provide clearance for a fillet weld of a scraper blade support bar to which the scraper blade is mountable.

20 Claims, 6 Drawing Sheets

U.S. PATENT DOCUMENTS

2001/0054538 A1    12/2001    Finger et al.
2006/0131135 A1    6/2006    Waters et al.
2006/0131136 A1    6/2006    Smith et al.

OTHER PUBLICATIONS

Flexco, "Belt Cleaner Component Comparisons", © 2007, 6 pages.
Flexco, "ConShear Retrofit Replacement Blades for OEM Belt Cleaners—Part Number Cross-Reference Guide", © 2008, 11 pages.
ASGCO, "ASGCO Primary Belt Cleaners", printed Mar. 18, 2010, 15 pages, www.asgco.com/primary_cleaners.asp.
ASGCO, "ASGCO Secondary Belt Cleaners", printed Mar. 18, 2010, 7 pages, www.asgco.com/secondary_cleaners.asp.
International Searching Authority, "PCT International Search Report & Written Opinion", Application No. PCT/US2009/069186, Oct. 19, 2010, 7 pages.

* cited by examiner

CONVEYOR BELT SCRAPER BLADE

This application claims the benefit of the filing date of U.S. Provisional Patent Application No. 61/244,249 entitled "CONVEYOR BELT SCRAPER BLADE" filed Sep. 21, 2009, which is hereby incorporated herein by reference in its entirety.

The present invention relates to a scraper blade, and, in particular, to a scraper blade for a conveyor system.

Conveyor systems typically include a primary scraper which is used to remove material deposits that adhere to the surface of the belt, and may include one or more secondary scraper blades which are used to remove material deposits along the return path as the belt returns to the tail roller. These primary scrapers are typically located near the head pulley to clean the belt on the return side, and secondary scrapers, if any, are located along the return path of the belt. A typical scraper has a flexible plastic, e.g., polyurethane, body that is mounted on a support shaft that spans a conveyor belt and that usually includes a tensioner that presses the scraper against the conveyor belt for removing material therefrom. Some scraper blades are molded to a metal base to facilitate their being mounted to a support shaft.

As the scraper blade (scraper) is used, the end that bears against the conveyor belt (the blade edge) to remove material therefrom wears. As the polyurethane blade wears away a thin edge frequently develops on the trailing edge of the scraper blade which causes it to become less effective in removing material deposits from the conveyor belt. This thin remnant is referred to by some as a "feather edge."

The present state of the scraper art usually includes a polyurethane scraper having a tapered section with a smaller edge at the blade tip for contacting the conveyor belt on an oblique angle. Because of this geometry, the leading wear edge of the blade tip becomes thinner as it wears and reaches a point at which the edge becomes too thin and flimsy, e.g., feathered, and without sufficient stiffness and strength to effectively clean the belt.

The formation of a feather edge is more prevalent when the scraper is cleaning a relatively non-abrasive material from the conveyor belt, and/or where the conveyor belt is relatively smooth, and this non-abrasive material does not effectively keep the blade tip sharp, but allows a thin section of the blade tip to bend away from the belt and not be worn away, and so the thin piece tends to grow making the cleaning of the belt ineffective.

Another condition that results in the formation of a feather edge occurs when the mounting tube of the belt cleaner (e.g., the support for the scraper blade) is located too close to the surface of the belt thus not creating a sufficient angle of attack with the belt to keep the scraper blade sharp.

An example prior art scraper blade is shown in U.S. Pat. No. 6,182,816 entitled "Scraper Blade for Conveyors" that was issued to A. Todd Gibbs and George T. Mott (the inventors herein) on Feb. 6, 2001. The scraper blade 14 therein includes an elastomeric or plastic body 23, 33, 43, 53 that extends from a metal base 21, 31, 41, 51, respectively, in the shape of a "flattened W" that telescopically engages a rectangular plate 22 that projects radially from a support shaft 20 that is angularly biased towards the conveyor belt. The plastic body 23, 33, 43, 53 of the scraper blade 14 has a scraping tip 27, 37, 47, 57, respectively.

FIG. 1 illustrates an example prior art scraper blade 14 that has a feathered edge 66 remaining on the blade tip 27 thereof which is at the end of blade body 23 opposite the metal base 21. Base 21 is in the shape of a "flattened W" and is molded together with the body 23 of the scraper blade 14.

Accordingly, there is a need for a scraper and a scraper blade that limits formation of a feather edge. It is therefore desirable that the scraper have a geometry that will cause the feather edge to periodically break off, thereby to leave a renewed cleaning edge.

To this end, a scraper blade for a conveyor may comprise: a blade body having a scraping edge and a base for mounting the scraper blade on a blade mount of a conveyor, wherein the blade body has a plurality of elongated recessed features extending across the rearward side thereof, wherein the elongated recessed features are spaced apart and are generally parallel to the scraping edge. A feathered edge remnant from wear of the blade body tends to separate from the blade body when wear reaches a recessed feature.

In another aspect, the base of the blade body may be affixed to a scraper blade mount having a shape of a "flattened W" defining a groove or slot that has beveled edges to provide clearance for a fillet weld of a scraper blade support bar to which the scraper blade is mountable.

BRIEF DESCRIPTION OF THE DRAWING

The detailed description of the preferred embodiment(s) will be more easily and better understood when read in conjunction with the FIGURES of the Drawing which include.

Figure 1:
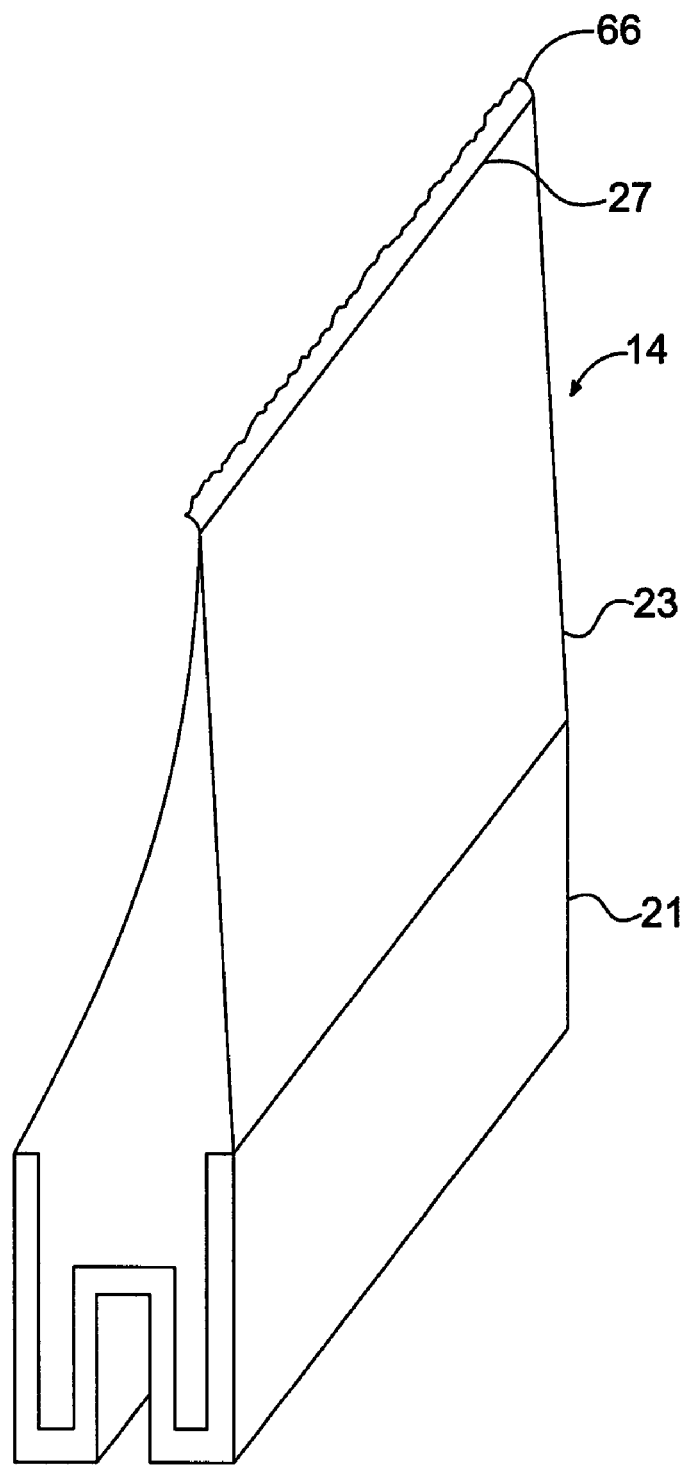
FIG. 1 illustrates an example of a prior art scraper blade that has a feathered edge remaining on the blade tip thereof.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. According to common practice, the various features of the drawing are not to scale, and the dimensions of the various features may arbitrarily be expanded or reduced for clarity, and any value stated in any Figure is given by way of example only.

DESCRIPTION OF THE PREFERRED EMBODIMENT(S)

The present scraper blade 100 addresses and is seen to mitigate the problem of a feather edge 66 forming at the scraping blade tip 130 as scraper blade 100 wears with use. To this end, plural slots or grooves 140 are provided in the side 114 of scraper blade 100 whereby as scraper blade 100 wears down to each slot or groove 140, the feather edge 66 breaks away and is removed as the scraper blade 100 wears through each slot or groove 140. Each time a feather edge 66 breaks away, i.e. as wear reaches one of removal grooves 140, the trailing side edge of scraper blade 100 is renewed as a clean edge without a significant feather edge.

The present improved scraper blade 100 preferably has plural recessed cutouts 140 on the trailing side 114 on the scraper 100 for removing the thin edges 66. It is therefore the object to mitigate the disadvantages of the existing art by intermittently adding a geometry that will cause the feather edge to break off leaving a renewed cleaning edge.

Figure 2:
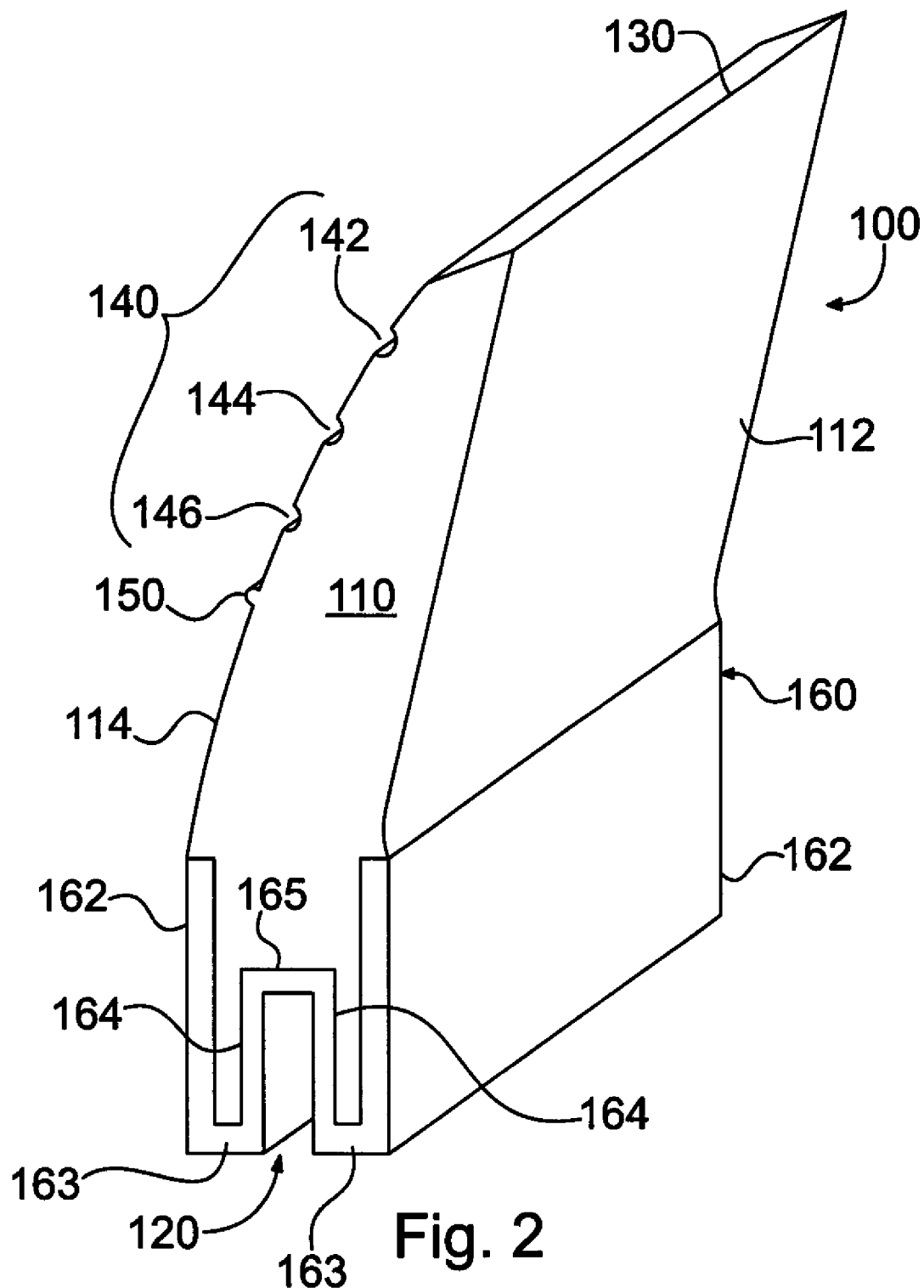
FIG. 2 is an overall view of an example embodiment of an improved scraper blade according to the present arrangement.

FIG. 2 is an overall view of an example embodiment of an improved scraper blade 100 according to the present arrangement. Scraper blade 100 includes a blade body 110 having a base 120 at one end and a blade tip 130 at the opposite end, and having two surfaces 112, 114 between the ends 120, 130 thereof. In use, surface 112 is preferably the "leading" surface which would be positioned closer to the conveyor belt and surface 114 is the "trailing surface" which would be positioned away from the conveyor belt. Base 120 may include an optional metal base 160 in the shape of a "flattened W" or "squared-off W." When base 160 is provided, blade body 110 is molded into the space between outer walls 162 and inner walls 164 which is closed at the bottom by sections 163. Inner walls 164 define a cavity or recess closed at its top by wall section 165 into which a shaft support bar 220 fits when blade 100 is mounted on a support shaft 210 having such support bar 220.

On surface 114 are provided plural recesses 140 that are spaced apart and run generally parallel to blade edge 130. Recesses 140 may be slots, grooves, semi-circular cutouts, or other open features that are of sufficient size relative to the thickness of blade body 110 near where the particular recess 142, 144, 146 is located so as to allow the section of blade body between the particular recess 142, 144, 146 to break away and take the feather edge thereon with it when blade body 110 wears away to about the particular recess 142, 144, 146.

As shown in FIG. 2, scraper blade 100 has three (3) semi circular cutouts 142, 144, 146 and one (1) semi circular protrusion 150 on the trailing edge 114 of blade body 110. Leading surface 112 of blade body 110 extends upward from base 120 (and from one wall 162 of metal base 130 where a metal base is provided) to blade tip 130 and is typically curved towards the conveyor belt, e.g., relative to a radial extending from the centerline of the rotatable support shaft on which scraper blade 100 is mounted. Trailing surface 114 of blade body 110 extends upward from base 120 (and from the other wall 162 of metal base 130 where a metal base is provided) so as to intersect with leading surface 112 to define blade tip 130 thereat and typically is also curved towards the conveyor belt, e.g., relative to a radial extending from the centerline of the rotatable support shaft on which scraper blade 100 is mounted. While surfaces 112, 114 are described as "curved," the shape thereof may be curved, arced, segmented flat sections, segmented curved sections, or any combination thereof as may be desirable, thereby to provide the curved blade body 110 as is desirable and preferred for maintaining a suitable blade tip 130 shape as blade body 110 wears away with use.

Figure 3A:
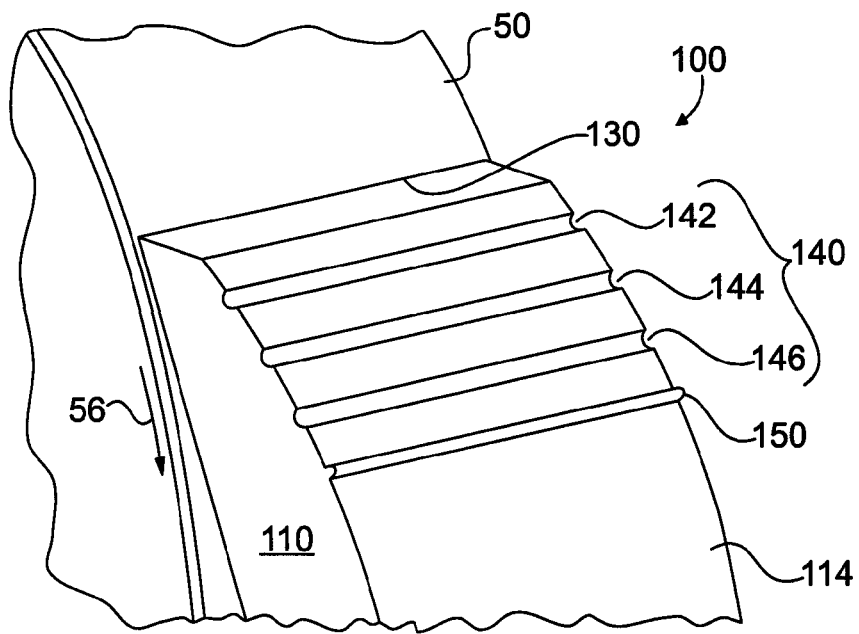
FIG. 3 includes FIGS. 3A-3E which are a sequence of views illustrating the wearing away of the example improved scraper blade of FIG. 2 when in use with a conveyor belt.

FIG. 3 includes FIGS. 3A-3E which are a sequence of views illustrating the wearing away of the example improved scraper blade of FIG. 2 when in use with a conveyor belt. FIG. 3A illustrates a new scraper blade 100 positioned with its blade edge 130 of blade body 110 in contact with conveyor belt 50 which moves in the direction indicated by arrow 56. Breakaway slots or grooves 142, 144, 146 and wear indicator ridge 150 are on the trailing side 114 of blade 100, i.e., the side not adjacent to conveyor belt 50.

After use of scraper blade 100 commences, the original blade tip or original cleaning edge 130 of blade body 110 wears away and the end of blade body 110 develops a wearing cleaning edge 130' that is against conveyor belt 50. Because of the location of the support shaft (not shown) on which blade 100 is mounted and of the angle of attack of blade body 110 with respect to conveyor belt 50, blade body 110 wears in a way that both sides 112 and 114 wear away, thereby bringing the worn cleaning edge 130' of blade body closer to breakaway slots 142, 144, 146 as blade body wears away. In other words, as blade body 110 wears away with use, the distance between cleaning edge 130' and base 120 of blade 100 becomes smaller.

The angle of attack of scraper blade 100 with respect to conveyor belt 50 and the shape of blade body 110 combine so that cleaning edge 130' is generally an edge presenting an acute angle to conveyor belt 50, e.g., for better cleaning thereof. Preferably the geometry of blade 100 and its support (not shown) is adjusted so that the angle of attack and the shape of the cleaning edge 130' remains within an acceptable range throughout the useful life of scraper blade 100, however, even if that geometry is not properly configured, the breakaway slots 142, 144, 146 and wear indicator 150 of blade body 110 may still be functional as described, in whole or in part, and may be beneficial to the cleaning provided by scraper blade 100 as described.

Figure 3B:
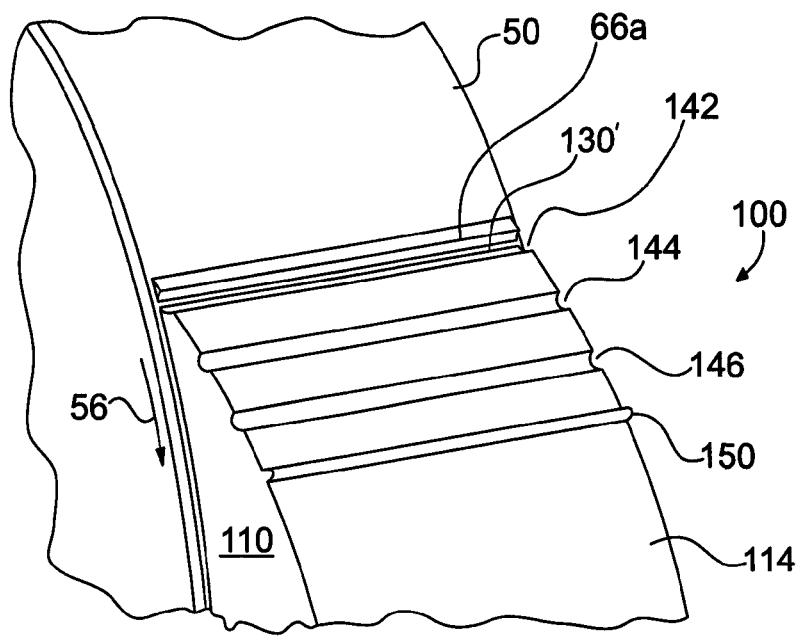

FIG. 3B illustrates a partially worn scraper blade 100 positioned with its blade body 110 in contact with conveyor belt 50 which moves in the direction indicated by arrow 56, wherein blade body 110 is worn away up to about the location of the first breakaway slot 142. As blade body 110 wears to the point that cleaning edge 130' intersects breakaway slot 142, the portion 66a of blade body 110 forward of breakaway slot 142 breaks off. The portion 66a that breaks off, e.g., "removed blade body" 66a, includes whatever feather edge might have developed as blade body 110 has worn to that point, thereby to renew cleaning edge 130' for better cleaning because the feather edge is no longer present; it being noted that the thickness of blade body 110 at renewed cleaning edge 130' is approximately equal to the depth of breakaway slot or groove 142. Furthermore, at these positions a feather edge tends not to appear because the blade body 110 is restored to a larger thickness which will not create a feather edge, rather than to a thin pointed edge which does tend to form a feather edge.

Figure 3C:
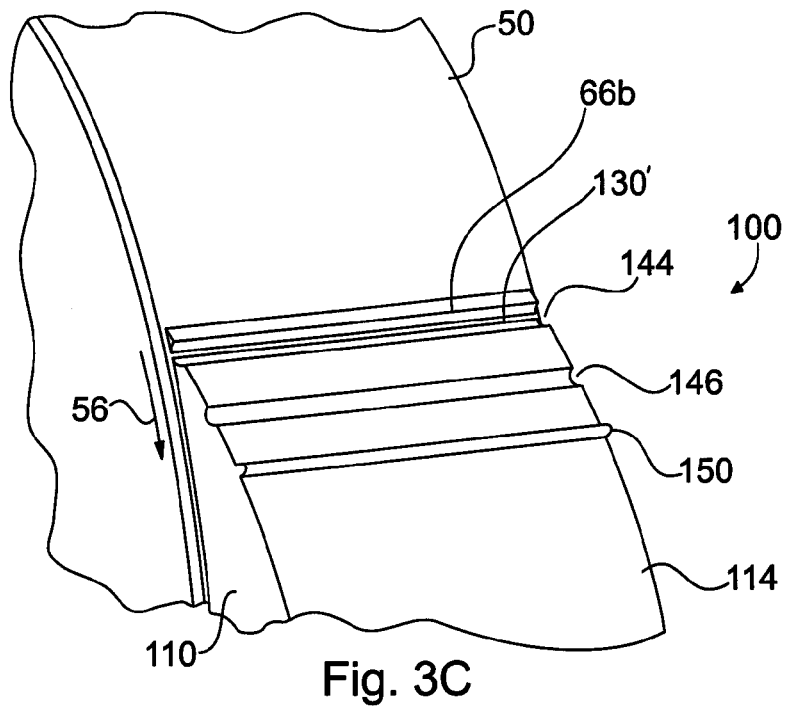

FIG. 3C illustrates a partially worn scraper blade 100 positioned with its blade body 110 in contact with conveyor belt 50 which moves in the direction indicated by arrow 56, wherein blade body 110 is worn away up more to about the location of the second breakaway slot 144. As blade body 110 wears to the point that cleaning edge 130' intersects breakaway slot 144, the portion 66a of blade body 110 forward of breakaway slot 144 breaks off. The portion 66b that breaks off includes whatever feather edge might have developed as blade body 110 has worn to that point, thereby to renew cleaning edge 130' for better cleaning because the feather edge is no longer present; it being noted that the thickness of blade body 110 at renewed cleaning edge 130' is approximately equal to the depth of breakaway slot or groove 144. Furthermore, at these positions a feather edge tends not to appear because the blade body 110 is restored to a larger thickness which will not create a feather edge, rather than to a thin pointed edge which does tend to form a feather edge.

Figure 3D:
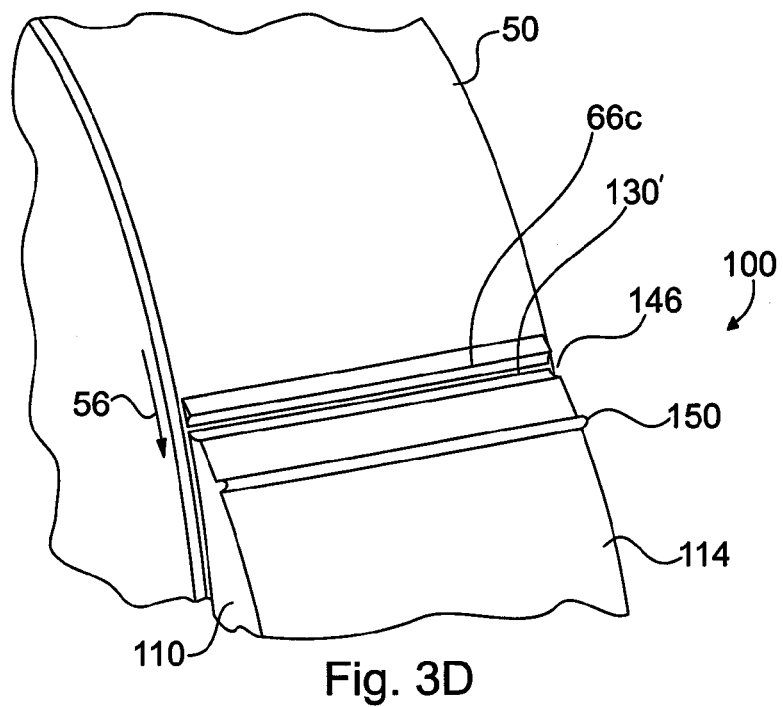

FIG. 3D illustrates a partially worn scraper blade 100 positioned with its blade body 110 in contact with conveyor belt 50 which moves in the direction indicated by arrow 56, wherein blade body 110 is worn away up to about the location of the third breakaway slot 146. As blade body 110 wears to the point that cleaning edge 130' intersects breakaway slot 146, the portion 66c of blade body 110 forward of breakaway slot 146 breaks off. The portion 66c that breaks off includes whatever feather edge might have developed as blade body 110 has worn to that point, thereby to renew cleaning edge 130' for better cleaning because the feather edge is no longer present; it being noted that the thickness of blade body 110 at renewed cleaning edge 130' is approximately equal to the depth of breakaway slot or groove 146. Furthermore, at these positions a feather edge tends not to appear because the blade body 110 is restored to a larger thickness which will not create a feather edge, rather than to a thin pointed edge which does tend to form a feather edge.

Figure 3E:
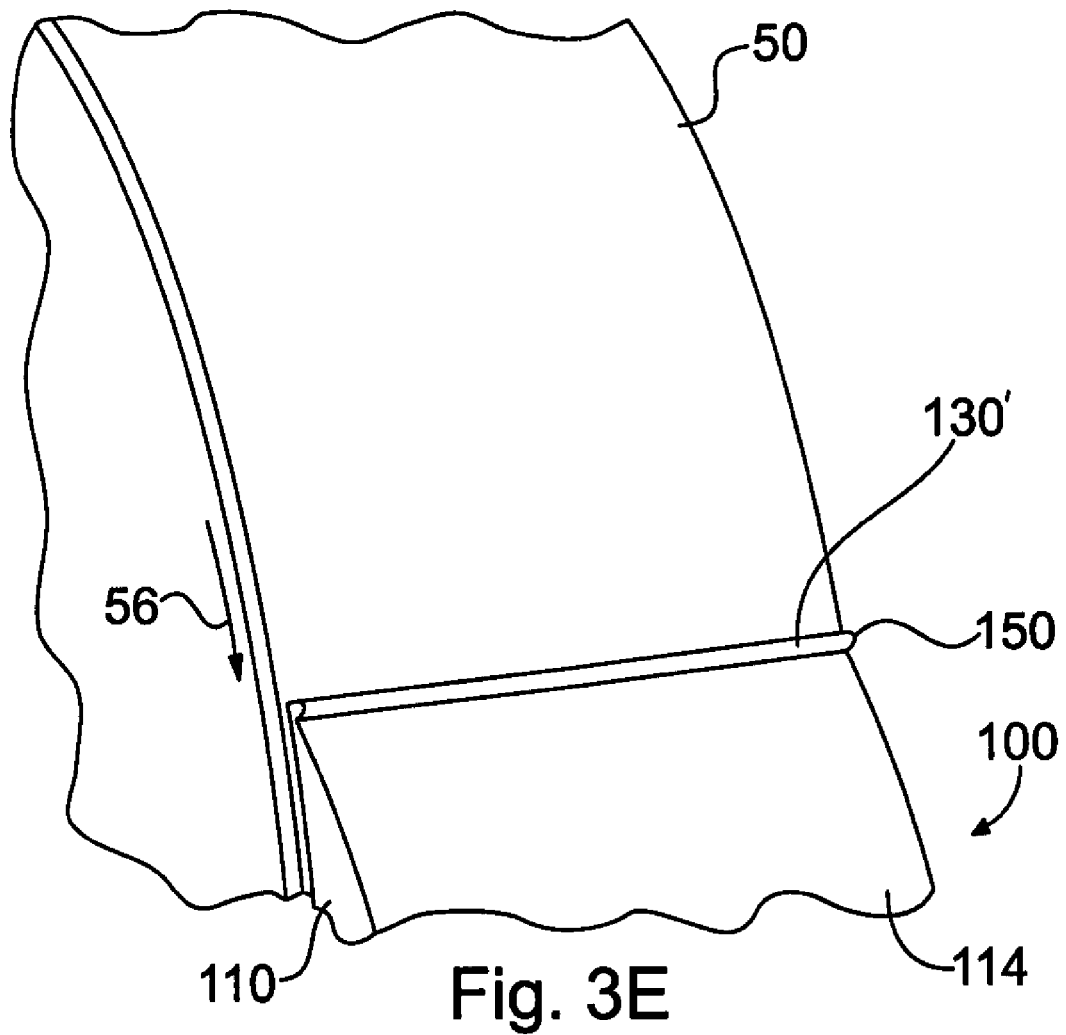

FIG. 3E illustrates a partially worn scraper blade 100 positioned with its blade body 110 in contact with conveyor belt 50 which moves in the direction indicated by arrow 56, wherein blade body 110 is worn away up to about the location of the raised wear indicator 150. At this point, blade body 110 of blade 100 is worn to the end of its useful service life and should be removed and replaced by a new scraper blade 100.

Figure 4:
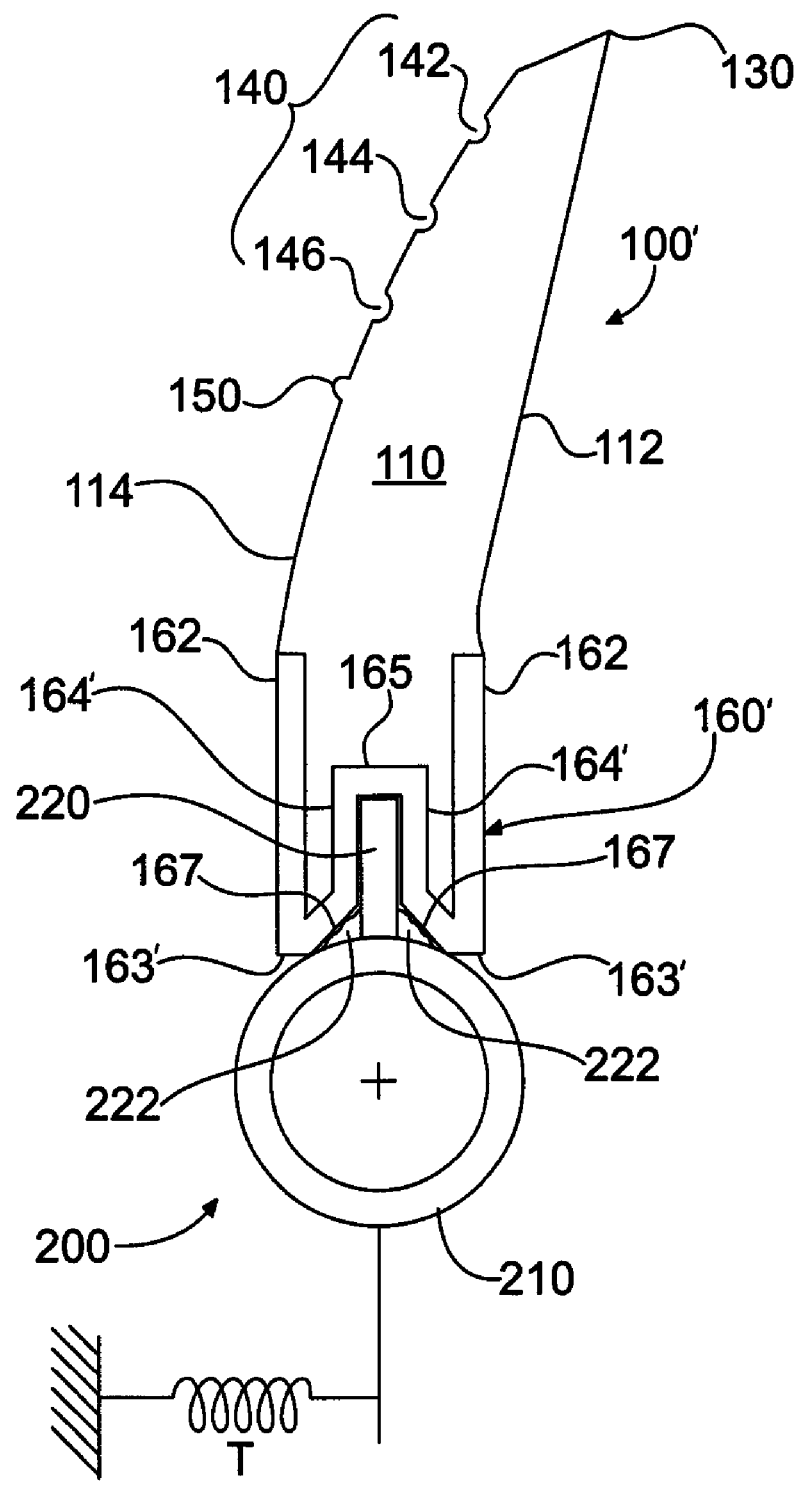
FIG. 4 is an end view of the example improved scraper blade of FIG. 2 including an alternative mounting base with a bevel shown mounted on a support shaft.

FIG. 4 is an end view of the example improved scraper blade 100 of FIG. 2 including an alternative base 160' mounted on a support shaft 200. Blade 100 is the same as blade 100 described previously except that metal base 160' has beveled edges 167 at the intersections of inside walls 164' and bottom sections 163' thereby to present a wider opening to support 200 than is the case with metal base 160 as shown and described above. Otherwise, the spacing between inside walls 164' and the recess defined thereby with section 165, may be the same as that of inside walls 164 of metal base 160 above.

Blade support 200 includes a support shaft or tube 210 that is mounted transversely across a conveyor belt 50 and that has a support bar 220 attached thereto. Typically, support bar 220 is welded to shaft 210 and so weld fillets remain along that weld edge. Blade 100 is mounted on support shaft 210 with support bar 220 extending into the recess defined by inside walls 164, 164' of metal base 160. Beveled edges 167 provide clearance for weld fillets 222 so that metal base 160' may slip fully onto support bar 220 with support bar 220 fully seated in the recess of metal base 160 defined by inside walls 164' and end section 165 thereof. Support shaft 210 is rotatable so that the blade edge 130 of blade body 110 of scraper blade 100 may be moved closer to and farther from conveyor belt 50. Support shaft 210 is typically connected to a blade tensioner T, e.g., a spring driven tensioner T, that biases shaft 210 to rotate in the direction that moves blade tip 130 towards conveyor belt 50, as is known.

Scraper blades 100 are typically supplied in lengths from 18 to 96 inches (about 45.7 and 244 cm), generally in increments of 6 inches (about 15.2 cm) of length to correspond to the widths of 18 to 96-inch wide standard conveyor belts. Custom lengths may also be available; and different standard lengths may be available in countries where different standard conveyor belt widths are utilized.

In one example embodiment of a scraper blade 100, the scraper blade is about 48 inches (about 122 cm) wide, about 7¾ inches (about 19.7 cm) from base 120 to blade edge 130, and about 1¾ inches (about 4.5 cm) thick at base 120. Blade body 110 is of polyurethane, ultra high molecular weight (UHMW) polyethylene, rubber or other suitable plastic material. Where a metal base is employed, the blade body is preferably molded into the metal base, although it could be secured to the metal base by adhesive, bolts or other suitable means. Metal base 160, 160' is typically aluminum and is about 48 inches (about 122 cm) long (the same length as the blade body) and about 1¾ inches (about 4.5 cm) wide, with outer walls 162 being about 2⅜ inches (about 6 cm) high and about 3/16 inch (about 4.8 mm) thick, and with inner walls 164, 164' being about 1½ inches (about 3.8 cm) high and about 3/16 inch (about 4.8 mm) thick. The bevels between sides 163', 164' are at an angle of about 45° and are about 7/16 inch (about 11 mm). Breakaway slots 142, 144, 146 are semi-circular, are spaced apart by about ¾ inch (about 1.9 cm), and are about 1/16 inch (about 1.5 mm) deep. Wear indicator feature 150 is semi-circular and is raised by about ⅛ inch (about 3 mm) above the blade body surface, and is about ½ inch (about 1.3 cm) from the nearest breakaway slot 146.

The arrangement of the present scraper blade may be provided for scraper blades of different configurations, and may be applied to conventional blades, for example, to the scraper blade described in the present inventors' U.S. Pat. No. 6,182,816 entitled Scraper Blade for Conveyors issued Feb. 6, 2001. Breakaway slots or grooves 140 as described herein could be added to the body of blade 14 thereof on the outer surface 28a, 28b thereof. Additionally or alternatively, the base 21 of the blade 21 thereof could be modified to include lengthwise bevels 167 as described herein at the bottom ends of internal side walls 18, 19 thereof.

A scraper blade 100 for a conveyor may comprise: a blade body 110 having first and second opposing ends and having a forward side 112 and a rearward side 114 between the first and second ends, wherein the second end of blade body 110 provides a scraping edge 130, and wherein the first end of blade body 110 provides a base 120 for mounting the scraper blade 100 on a blade mount 200 of a conveyor 50, and blade body 110 having a plurality of elongated recessed features 140 extending across the rearward side 114 thereof, wherein the elongated recessed features 140 are spaced apart and are generally parallel to the scraping edge 130 of the first end of the scraper blade 100. The plurality of recessed features 140 may include spaced slots or grooves on the rearward side 114 of the scraper blade 100, whereby a feathered edge 66 produced by wear at the scraping edge 130 tends to separate from the blade body 110 when the scraper blade 100 wears to one of the recessed features 140, thereby to leave a renewed scraping edge 130 on the scraper blade 100. The recessed features 140 may include spaced semicircular slots or grooves on the rearward side 114 of the scraper blade 100, whereby a feathered edge 66 produced by wear at the scraping edge 130 tends to separate from the blade body 110 when the scraper blade 100 wears to one of the recessed features 140 thereby to leave a renewed scraping edge 130 on the scraper blade 100. The scraper blade 100 may further comprise at least one raised feature 150 extending across the rearward side 114 of blade body 110, wherein the at least one raised feature 150 is generally parallel to the scraping edge 130 of the first end of the scraper blade 100 and is further from the second end than are the elongated recessed features 140, whereby the at least one raised feature 150 provides an indication of wear of the scraper blade 100. The at least one raised feature 150 may include a semi-circular protrusion 150 on a trailing edge 114 of blade body 110 specifically following the last of the elongated recessed features 140 thereof in distance from the second end of blade body 110, whereby the scraper blade 100 may be replaced when worn to the semi-circular protrusion 150. Scraper blade 100 may further comprise a scraper blade mount 160 to which the base 120 at the first end of blade body 110 is affixed, scraper blade mount 160 having a groove 164-165 for receiving a scraper blade support bar 220 therein. The groove 164-165 of scraper blade mount 160 may have beveled edges 167 at the entrance to the groove to provide clearance for a fillet weld 222 of the scraper blade support bar 220 to which scraper blade 100 is mountable. Walls 162 of scraper blade mount 160 adjacent the forward and rearward sides of blade body 110 extend further from the base 120 of blade body 110 than the depth of the groove 164-165 of scraper blade mount 160, e.g., as defined by walls 164.

A scraper blade 100 for a conveyor may comprise: a blade body 110 having first and second opposing ends and having a forward side 112 and a rearward side 114 between the first and second ends, wherein the second end of blade body 110 provides a scraping edge 130, and wherein the first end of blade body 110 provides a base 120 for mounting the scraper blade 100 on a blade mount 200 of a conveyor 50, and a scraper blade mount 160 to which the base 120 at the first end of blade body 110 is affixed, scraper blade mount 160 having a shape of a "flattened W" defining a groove 164-165 for receiving a scraper blade support bar 220 therein, wherein the groove 164-165 of scraper blade mount 160 has beveled edges 167 at the entrance to the groove 164-165 to provide clearance for a fillet weld 222 of the scraper blade support bar 220 to which scraper blade 100 is mountable. Walls 162 of scraper blade mount 160 adjacent the forward and rearward sides of blade body 110 extend further from the base 120 of blade body 110 than the depth of the groove 164-165 of scraper blade mount 160, e.g., as defined by walls 164. Blade body 110 may have a plurality of elongated recessed features 140 extending across the rearward side 114 thereof, wherein the elongated recessed features 140 are spaced apart and are generally parallel to the scraping edge 130 of the first end of the scraper blade 100. The scraper blade 100 may further comprise at least one raised feature 150 extending across the rearward side 114 of blade body 110, wherein the at least one raised feature 150 is generally parallel to the scraping edge 130 of the first end of the scraper blade 100 and is further from the second end than are the elongated recessed features 140, whereby the at least one raised feature 150 provides an indication of wear of the scraper blade 100. The plurality of recessed features 140 may include spaced slots or grooves 140 on the rearward side 114 of the scraper blade 100, or may include spaced semicircular slots or grooves 140 on the rearward side 114 of the scraper blade 100. The at least one raised feature 150 may include a semi-circular protrusion 150 on a trailing edge 114 of blade body 110 specifically following the last of the elongated recessed features 140 thereof in distance from the second end of blade body 110, whereby the scraper blade 100 may be replaced when worn to the semi-circular protrusion 150.

A scraper blade 100 for a conveyor may comprise: a blade body 110 having first and second opposing ends and having a forward side 112 and a rearward side 114 between the first and second ends, wherein the second end of blade body 110 provides a scraping edge 130, and wherein the first end of blade body 110 provides a base 120 for mounting the scraper blade 100 on a blade mount 200 of a conveyor 50, blade body 110 having a plurality of elongated recessed features 140 extending across the rearward side 114 thereof, wherein the elongated recessed features 140 are spaced apart and are generally parallel to the scraping edge 130 of the first end of the scraper blade 100; and a scraper blade mount 160 to which the base 120 at the first end of blade body 110 is affixed, scraper blade mount 160 having a shape of a "flattened W" defining a groove 164-165 for receiving a scraper blade support bar 220 therein, wherein the groove 164-165 of scraper blade mount 160 has beveled edges 167 at the entrance to the groove 164-165 to provide clearance for a fillet weld 222 of the scraper blade support bar 220 to which scraper blade 100 is mountable. The plurality of recessed features 140 may include spaced slots or grooves on the rearward side 114 of the scraper blade 100, whereby a feathered edge 66 produced by wear at the scraping edge 130 tends to separate from the blade body 110 when the scraper blade 100 wears to one of the recessed features 140, thereby to leave a renewed scraping edge 130 on the scraper blade 100. The recessed features 140 may include spaced semicircular slots or grooves on the rearward side 114 of the scraper blade 100, whereby a feathered edge 66 produced by wear at the scraping edge 130 tends to separate from the blade body 110 when the scraper blade 100 wears to one of the recessed features 140 thereby to leave a renewed scraping edge 130 on the scraper blade 100. The scraper blade 100 may further comprise at least one raised feature 150 extending across the rearward side 114 of blade body 110, wherein the at least one raised feature 150 is generally parallel to the scraping edge 130 of the first end of the scraper blade 100 and is further from the second end than are the elongated recessed features 140, whereby the at least one raised feature 150 provides an indication of wear of the scraper blade 100. The at least one raised feature 150 may include a semi-circular protrusion 150 on a trailing edge 114 of blade body 110 specifically following the last of the elongated recessed features 140 thereof in distance from the second end of blade body 110, whereby the scraper blade 100 may be replaced when worn to the semi-circular protrusion 150. Walls 162 of scraper blade mount 160 adjacent the forward and rearward sides of blade body 110 extend further from the base 120 of blade body 110 than the depth of the groove 164-165 of scraper blade mount 160, e.g., as defined by walls 164.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms of position, orientation and/or direction such as "up," "down," "left," "right," "front," "rear," "forward," "backward," "leading," "trailing," "under" and/or "over," and the like may be used herein as a convenience in describing one or more embodiments and/or uses of the present arrangement, the articles described may be positioned in any desired position and/or orientation, and may be utilized in any desired position, orientation and/or direction. Such terms of position and/or orientation should be understood as being for convenience only, and not as limiting of the invention as claimed.

While the present invention has been described in terms of the foregoing example embodiments, variations within the scope and spirit of the present invention as defined by the claims following will be apparent to those skilled in the art. For example, scraper blade 100 may be a single blade or may be a blade employing two or more adjacent sections that would be mounted end-to-end on a support shaft.

It is noted that the blade body having breakaway slots or grooves 140 may include a metal base 160 as illustrated or may not include a metal base in which case blade body 110 would be mounted directly to a support shaft by any of certain known arrangements, as may be desirable with regard to any particular blade and/or conveyor application.

It is also noted that a scraper blade 100 having a base 160' that has beveled edges 167 may be employed with a blade body that has breakaway slots 140 and/or wear indicator 150, or with a blade body that lacks breakaway slots 140 and/or wear indicator 150, as may be desirable with regard to any particular blade and/or conveyor application.

Each of the U.S. Provisional applications, U.S. patent applications, and/or U.S. patents identified herein are hereby incorporated herein by reference in their entirety.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A scraper blade for a conveyor comprising:
   a blade body having first and second opposing ends and having a forward side and a rearward side between the first and second ends, wherein the second end of said blade body provides a scraping edge and wherein the first end of said blade body provides a base for mounting the scraper blade on a blade mount of a conveyor, and
   said blade body having a plurality of elongated recessed features extending across the rearward side thereof, wherein the elongated recessed features are spaced apart and are generally parallel to the scraping edge of the first end of the scraper blade,
   at least one raised feature extending across the rearward side of said blade body, wherein the at least one raised feature is generally parallel to the scraping edge of the first end of the scraper blade and is further from the second end than are the elongated recessed features,
   whereby a feathered edge produced by wear at the scraping edge tends to separate from the blade body when the scraper blade wears to one of the recessed features, thereby to leave a renewed scraping edge on the scraper blade, and whereby the at least one raised feature provides an indication of wear of the scraper blade.

2. The scraper blade of claim 1 wherein the plurality of recessed features includes spaced slots or grooves on the rearward side of the scraper blade.

3. The scraper blade of claim 1 wherein the plurality of recessed features includes spaced semicircular slots or grooves on the rearward side of the scraper blade.

4. The scraper blade of claim 1 wherein said at least one raised feature includes a semi-circular protrusion on a trailing edge of said blade body specifically following the last of the elongated recessed features thereof in distance from the second end of said blade body, whereby the scraper blade may be replaced when worn to the semi-circular protrusion.

5. The scraper blade of claim 1 wherein said blade body includes polyurethane, ultra high molecular weight polyethylene, rubber, a plastic material, or a combination thereof.

6. The scraper blade of claim 1 further comprising a scraper blade mount to which the base at the first end of said blade body is affixed, said scraper blade mount having a groove for receiving a scraper blade support bar therein.

7. The scraper blade of claim 6 wherein the groove of said scraper blade mount has beveled edges at the entrance to the groove to provide clearance for a fillet weld of the scraper blade support bar to which said scraper blade is mountable.

8. A scraper blade for a conveyor comprising:
   a blade body having first and second opposing ends and having a forward side and a rearward side between the first and second ends, wherein the second end of said blade body provides a scraping edge, and wherein the first end of said blade body provides a base for mounting the scraper blade on a blade mount of a conveyor, and
   said blade body having a plurality of elongated recessed features extending across the rearward side thereof, wherein the elongated recessed features are spaced apart and are generally parallel to the scraping edge of the first end of the scraper blade,
   a scraper blade mount to which the base at the first end of said blade body is affixed, said scraper blade mount having a groove for receiving a scraper blade support bar therein,
   wherein the groove of said scraper blade mount has beveled edges at the entrance to the groove to provide clearance for a fillet weld of the scraper blade support bar to which said scraper blade is mountable.

9. The scraper blade of claim 8 wherein walls of said scraper blade mount adjacent the forward and rearward sides of said blade body extend further from the base of said blade body than the depth of the groove of said scraper blade mount.

10. The scraper blade of claim 8 wherein:
    the plurality of recessed features includes spaced slots or grooves on the rearward side of the scraper blade; or
    the plurality of recessed features includes spaced semicircular slots or grooves on the rearward side of the scraper blade.

11. The scraper blade of claim 8 wherein said blade body includes polyurethane, ultra high molecular weight polyethylene, rubber, a plastic material, or a combination thereof.

12. A scraper blade for a conveyor comprising:
    a blade body having first and second opposing ends and having a forward side and a rearward side between the first and second ends, wherein the second end of said blade body provides a scraping edge, and wherein the first end of said blade body provides a base for mounting the scraper blade on a blade mount of a conveyor,
    said blade body having a plurality of elongated recessed features extending across the rearward side thereof, wherein the elongated recessed features are spaced apart and are generally parallel to the scraping edge of the first end of the scraper blade; and
    a scraper blade mount to which the base at the first end of said blade body is affixed, said scraper blade mount having a shape of a "flattened W" defining a groove for receiving a scraper blade support bar therein,
    wherein the groove of said scraper blade mount has beveled edges at the entrance to the groove to provide clearance for a fillet weld of the scraper blade support bar to which said scraper blade is mountable.

13. The scraper blade of claim 12 wherein the plurality of recessed features includes spaced slots or grooves on the rearward side of the scraper blade.

14. The scraper blade of claim 12 wherein the plurality of recessed features includes spaced semicircular slots or grooves on the rearward side of the scraper blade.

15. A scraper blade for a conveyor comprising:
    a blade body having first and second opposing ends and having a forward side and a rearward side between the first and second ends, wherein the second end of said blade body provides a scraping edge, and wherein the first end of said blade body provides a base for mounting the scraper blade on a blade mount of a conveyor,
    said blade body having a plurality of elongated recessed features extending across the rearward side thereof, wherein the elongated recessed features are spaced apart and are generally parallel to the scraping edge of the first end of the scraper blade:
    a scraper blade mount to which the base at the first end of said blade body is affixed, said scraper blade mount having a shape of a "flattened W" defining a groove for receiving a scraper blade support bar therein; and
    at least one raised feature extending across the rearward side of said blade body, wherein the at least one raised feature is generally parallel to the scraping edge of the first end of the scraper blade and is further from the second end than are the elongated recessed features, whereby the at least one raised feature provides an indication of wear of the scraper blade.

16. The scraper blade of claim 15 wherein said at least one raised feature includes a semi-circular protrusion on a trailing edge of said blade body specifically following the last of the elongated recessed features thereof in distance from the second end of said blade body, whereby the scraper blade may be replaced when worn to the semi-circular protrusion.

17. The scraper blade of claim 12 wherein walls of said scraper blade mount adjacent the forward and rearward sides of said blade body extend further from the base of said blade body than the depth of the groove of said scraper blade mount.

18. The scraper blade of claim 12 wherein said blade body includes polyurethane, ultra high molecular weight polyethylene, rubber, a plastic material, or a combination thereof.

19. The scraper blade of claim 15 wherein:
the plurality of recessed features includes spaced slots or grooves on the rearward side of the scraper blade; or
the plurality of recessed features includes spaced semicircular slots or grooves on the rearward side of the scraper blade.

20. The scraper blade of claim 15 wherein said blade body includes polyurethane, ultra high molecular weight polyethylene, rubber, a plastic material, or a combination thereof.

* * * * *